US009846677B2

United States Patent
Wang et al.

(10) Patent No.: US 9,846,677 B2
(45) Date of Patent: Dec. 19, 2017

(54) EVENT-BASED SPATIAL TRANSFORMATION

(71) Applicant: QUALCOMM Incorporated, San Diego, CA (US)

(72) Inventors: Xin Wang, San Diego, CA (US); Manu Rastogi, San Diego, CA (US); Venkat Rangan, San Diego, CA (US); William Howard Constable, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 148 days.

(21) Appl. No.: 14/855,351

(22) Filed: Sep. 15, 2015

(65) Prior Publication Data

US 2016/0078001 A1    Mar. 17, 2016

Related U.S. Application Data

(60) Provisional application No. 62/051,187, filed on Sep. 16, 2014.

(51) Int. Cl.
*G06F 17/14* (2006.01)
*G06K 9/20* (2006.01)
*G06K 9/52* (2006.01)

(52) U.S. Cl.
CPC ............. *G06F 17/141* (2013.01); *G06K 9/20* (2013.01); *G06K 9/522* (2013.01)

(58) Field of Classification Search
CPC .................... G06K 9/52; G06K 9/522; G06K 2009/00738; G06F 17/141
See application file for complete search history.

(56) References Cited

U.S. PATENT DOCUMENTS

| 8,401,825 | B2 | 3/2013 | Ascari et al. |
| 8,463,721 | B2 | 6/2013 | Prokhorov |
| 8,825,306 | B2 | 9/2014 | Dankers |
| 2013/0085642 | A1* | 4/2013 | Dankers ................. B60T 8/172 701/48 |
| 2014/0081895 | A1 | 3/2014 | Coenen et al. |
| 2014/0085447 | A1 | 3/2014 | Lorach et al. |
| 2015/0095818 | A1* | 4/2015 | Lee ..................... G06F 3/04842 715/765 |

OTHER PUBLICATIONS

Choi T.Y. W., et al., "Neuromorphic Implementation of Orientation Hypercolumns," IEEE Transactions on Circuits and Systems Part I: Regular Papers, vol. 52, No. 6, Jun. 2005 (Jun. 2005), pp. 1049-1060, XP011136060, DOI: 10.1109/TCSI.2005.849136.

(Continued)

*Primary Examiner* — Michael D Yaary
(74) *Attorney, Agent, or Firm* — Seyfarth Shaw LLP

(57) ABSTRACT

A method for computing a spatial Fourier transform for an event-based system includes receiving an asynchronous event output stream including one or more events from a sensor. The method further includes computing a discrete Fourier transform (DFT) matrix based on dimensions of the sensor. The method also includes computing an output based on the DFT matrix and applying the output to an event processor.

12 Claims, 5 Drawing Sheets

(56) References Cited

OTHER PUBLICATIONS

Ghosh S., et al., "ASPEN: an Asynchronous Signal Processor for Energy Efficient Sensor Nodes," Proceedings of the 17th IEEE International Conference on Electronics, Circuits, and Systems (ICECS110), Dec. 12, 2010 (Dec. 12, 2010), pp. 268-272, XP031922956, DOI: 10.1109/ICECS.2010.5724505.
International Search Report and Written Opinion—PCT/US2015/050440—ISA/EPO—dated Feb. 18, 2016.
Posch C., et al., "A Microbolometer Asynchronous Dynamic Vision Sensor for LWIR," IEEE Sensors Journal, Apr. 2009 (Apr. 29, 2009), vol. 9, No. 6, pp. 654-664, XP011256553, DOI: 10.1109/JSEN.2009.2020658 sections VI.B.2).
Sashima A., et al., "CONSORTS-S: a Mobile Sensing Platform for Context-Aware Services," Proceedings of the 2008 International Conference on Intelligent Sensors, Sensor Networks and Information Processing (ISSNIP'08), Dec. 15, 2008 (Dec. 15, 2008), pp. 417-422, XP031412600, DOI: 10.1109/ISSNIP.2008.4762024.

\* cited by examiner

EVENT-BASED SPATIAL TRANSFORMATION

CROSS REFERENCE TO RELATED APPLICATION

This application claims the benefit under 35 U.S.C. §119(e) to U.S. Provisional Patent Application No. 62/051,187, entitled "EVENT BASED SPATIAL TRANSFORMATION," filed on Sep. 16, 2014, the disclosure of which is expressly incorporated herein by reference in its entirety.

BACKGROUND

Field

Certain aspects of the present disclosure generally relate to neural system engineering and, more particularly, to systems and methods for event-based down sampling.

Background

Machine vision enables machines to see and perceive. In conventional systems, a sensor, such as a video camera, is used for machine vision. Video cameras may be referred to as frame-based vision sensors because the video camera periodically samples visual data from a two-dimensional array of photosensitive elements. The human retina, in contrast, is an example of an event-based vision sensor. That is, individual neurons in the retina are sensitive to a portion of the visual field such that each neuron sends a signal toward the brain when there is a change to the portion of the visual field. Unlike conventional frame-based video cameras, there is no periodic sampling of all of the neurons in the retina. Rather, visual data is transmitted by the retina whenever there are transient visual events.

Similar to the retina, dynamic vision sensors (DVSs) include an array of photosensitive elements that detect and transmit visual events. An individual photosensitive element of a dynamic vision sensor transmits a signal when there is a change in luminance at a portion of a visual scene. As an example, an event-driven object detection system may use a dynamic vision sensor to detect moving objects, such as faces or cars, and classify the detected objects in real time based on prior training.

In some cases, event-based sampling is specified to improve temporal sensitivity. That is, a frame-based sensor may be limited to sampling visual information based on the speed at which the frame-based sensor can read a frame of image data. In contrast, a photosensitive element within a dynamic vision sensor may sample visual information based on the speed at which the photosensitive element can detect changes in a portion of the visual field. In addition to improved temporal sensitivity, a photosensitive element may consume less power, on average, in comparison with a frame-based sensor because a photosensitive element remains inactive when there are no changes to the visual scene.

Still, the improved temporal sensitivity and lower power consumption have yet to be fully realized in conventional event-based vision systems. Specifically, the number of known processing techniques for event-based sensor outputs is less than the number of machine vision techniques for frame-based vision sensors. Common techniques developed for frame-based sensors include efficient down-sampling, sub-sampling, interpolation, fast Fourier transforms, and neural network based object classification.

In some cases, to improve techniques that have been developed for frame-based machine vision systems, the output of a dynamic vision sensor may be used to periodically reconstruct image frames. Furthermore, conventional image processing techniques may be applied to the resulting frames. However, the conversion to image frames may reduce the performance of an event-based vision system. Thus, it is desirable to convert frame-based techniques to an event-based system without reducing the performance of an event-based sensor.

SUMMARY

In one aspect of the present disclosure, a method of computing a spatial Fourier transform for an event-based system is disclosed. The method includes receiving an asynchronous event output stream comprising one or more events from a sensor. The method also includes computing a discrete Fourier transform (DFT) matrix based on dimensions of the sensor. The method further includes computing an output based on the DFT matrix. The method still further includes applying the output to an event processor.

Another aspect of the present disclosure is directed to an apparatus including means for receiving an asynchronous event output stream comprising one or more events from a sensor. The apparatus also includes means for computing a DFT matrix based on dimensions of the sensor. The apparatus further includes means for computing an output based on the DFT matrix. The apparatus still further includes means for applying the output to an event processor.

In another aspect of the present disclosure, a non-transitory computer-readable medium with non-transitory program code recorded thereon is disclosed. The program code, for computing a spatial Fourier transform for an event-based system, is executed by a processor and includes program code to receive an asynchronous event output stream comprising one or more events from a sensor. The program code also includes program code to compute a DFT matrix based on dimensions of the sensor. The program code further includes program code to compute an output based on the DFT matrix. The program code still further includes program code to apply the output to an event processor.

Another aspect of the present disclosure is directed to an apparatus for computing a spatial Fourier transform for an event-based system. The apparatus has a memory and one or more processors coupled to the memory. The processor(s) is configured to receive an asynchronous event output stream comprising one or more events from a sensor. The processor(s) is also configured to compute a DFT matrix based on dimensions of the sensor. The processor(s) is further configured to compute an output based on the DFT matrix. The processor(s) is still further configured to apply the output to an event processor.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
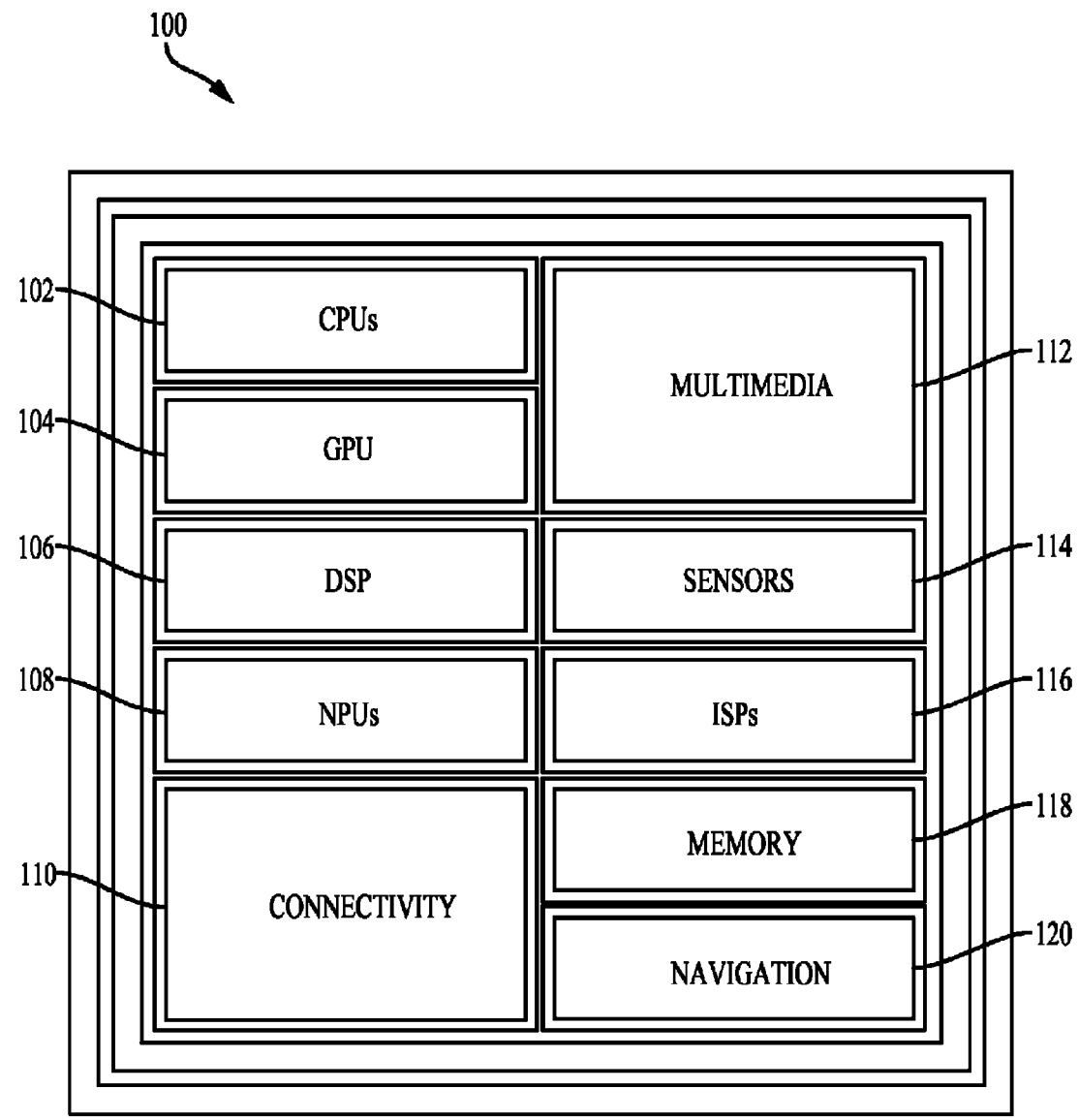
FIG. 1 illustrates an example implementation of designing a neural network using a System-on-a-Chip, including a general-purpose processor in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Event-Driven Object Detection System

As previously discussed, an event-driven object detection system may use a dynamic vision sensor (DVS) to detect moving objects, such as faces or cars, and classify the detected objects in real time based on prior training. The computations in the system may be triggered by sensor events. The event-driven object detection system may be referred to as the detection system.

According to an aspect of the present disclosure, a detection system processes visual input when an event is generated. That is, the detection system does not perform processing when events are not output from the dynamic vision sensor. For example, a dynamic vision sensor may be part of a surveillance system and may be pointed at a hallway and a door. If there is no change in the scene, the dynamic vision sensor will not send any outputs, and consequently, the detection system will not perform any computations. The dynamic vision sensor may produce outputs, and the event-based detection system may perform computations, when there is a change in the scene. For example, a dynamic vision sensor focused on a doorway may produce outputs when a person walks through the door.

Signal transformations, such as a Fourier transform, may be specified for signal processing. A transform may be used for image processing, such as image analysis, image filtering, image reconstruction, and/or image compression.

In one example, the Fourier transform may be specified to decompose an image into its sine and cosine components. That is, the input image is in the spatial domain and the output of the transformation represents the image in the frequency domain. Thus, the Fourier transform may be specified to detect the spatial frequency of the image.

In conventional systems, for frame based image processing, a Fourier transform may be performed based on a matrix multiplication of the frame. Still, as previously discussed, event-based systems do not generate frames. Rather, one or more pixels may spike in response to an event. Thus, conventional signal transformations are not available for event-based transformations. Therefore, it is desirable to provide image transformations techniques, such as a Fourier transform, to an event-based system.

FIG. 1 illustrates an example implementation of the aforementioned event-based transform using a system-on-a-chip (SOC) 100, which may include a general-purpose processor (CPU) or multi-core general-purpose processors (CPUs) 102 in accordance with certain aspects of the present disclosure. Variables (e.g., neural signals and synaptic weights), system parameters associated with a computational device (e.g., neural network with weights), delays, frequency bin information, and task information may be stored in a memory block associated with a Neural Processing Unit (NPU) 108, in a memory block associated with a CPU 102, in a memory block associated with a graphics processing unit (GPU) 104, in a memory block associated with a digital signal processor (DSP) 106, in a dedicated memory block 118, or may be distributed across multiple blocks. Instructions executed at the general-purpose processor 102 may be loaded from a program memory associated with the CPU 102 or may be loaded from a dedicated memory block 118.

The SOC 100 may also include additional processing blocks tailored to specific functions, such as a GPU 104, a DSP 106, a connectivity block 110, which may include fourth generation long term evolution (4G LTE) connectivity, unlicensed Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs) 116, and/or navigation 120, which may include a global positioning system.

The SOC 100 may be based on an ARM instruction set. In an aspect of the present disclosure, the instructions loaded into the general-purpose processor 102 may comprise code for receiving an asynchronous event output stream from an event-based sensor. The instructions loaded into the general-purpose processor 102 may also comprise code for computing a discrete Fourier transform (DFT) matrix based on dimensions of the event-based sensor. Additionally, the instructions loaded into the general-purpose processor 102 may comprise code for computing an output based on the DFT matrix. Furthermore, the instructions loaded into the general-purpose processor 102 may comprise code for applying the output to an event processor.

Figure 2:
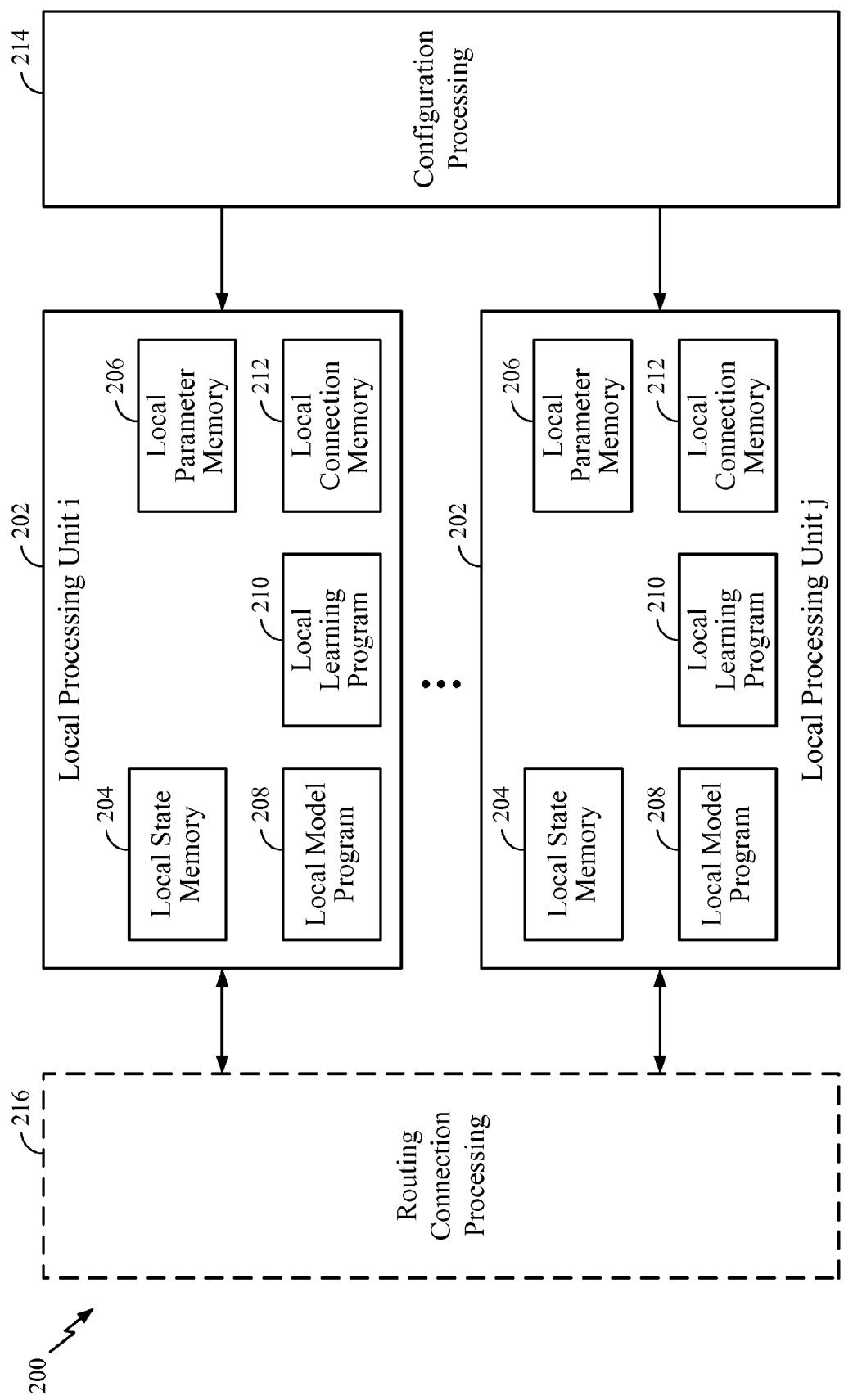
FIG. 2 illustrates an example implementation of a system in accordance with aspects of the present disclosure.

FIG. 2 illustrates an example implementation of a system 200 in accordance with certain aspects of the present disclosure. As illustrated in FIG. 2, the system 200 may have multiple local processing units 202 that may perform various operations of methods described herein. Each local processing unit 202 may comprise a local state memory 204 and a local parameter memory 206 that may store parameters of a neural network. In addition, the local processing unit 202 may have a local (neuron) model program (LMP) memory 208 for storing a local model program, a local learning program (LLP) memory 210 for storing a local learning program, and a local connection memory 212. Furthermore, as illustrated in FIG. 2, each local processing unit 202 may interface with a configuration processor unit 214 for providing configurations for local memories of the local processing unit, and with a routing connection processing unit 216 that provides routing between the local processing units 202.

Figure 3:
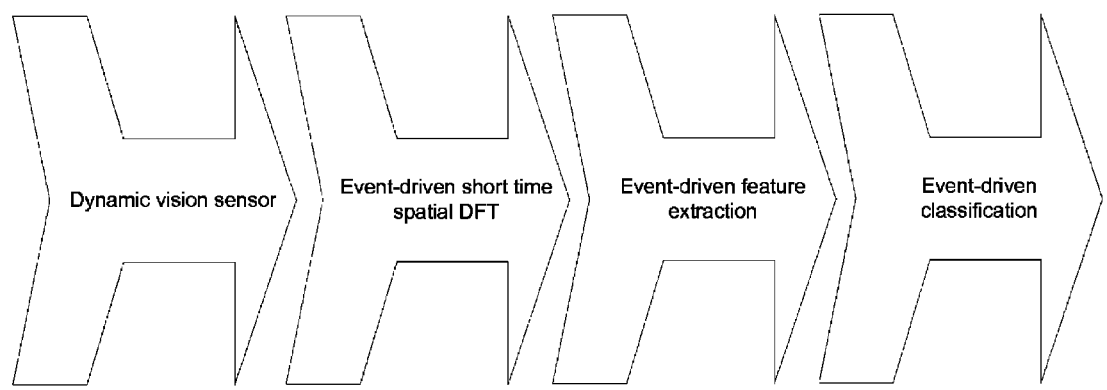
FIG. 3 illustrates an example of components of an event-driven object-detection system in accordance with certain aspects of the present disclosure.

According to aspects of the present disclosure, the detection system comprises various components for processing data. As an example, as shown in FIG. 3, the detection system may include a dynamic vision sensor (DVS) component, an event-driven short time spatial discrete Fourier transform (DFT) component, an event-driven feature extraction component, and an event-driven classification component.

In one configuration, the dynamic vision sensor is a sensor that detects events. As previously discussed, the events are generated from a change in intensity received at a photosensor element. For example, the dynamic vision sensor may be a DVS128 sensor from iniLabs. The sensor array may have a size of N×N (N=128) of which each pixel is a level-crossing sampler of log-luminance in time. The temporal resolution of the pixel is on the order of 10 micro seconds. The output of the dynamic vision sensor may be a polarized, coordinate-addressed event train $\{(t_k; p_k; \mu_k; v_k)\}$, where $t_k$ and $p_k$ are time stamps and polarities of events and $(\mu_k; v_k)$ are the pixel coordinates of event k at time $t_k$. Here, $t_k \in \mathbb{R}$, $p_k \in \{-1, 1\}$ and $\mu_k, v_k \in \{1, \ldots, 128\}$.

The pixel response functions may be defined as:

$$x_{\mu,v}(t) = \Sigma_k p_k \delta_{\mu,\mu_k} \delta_{v,v_k} \delta(t-t_k), \quad (1)$$

where $(\mu, v) \in \{1, \ldots, 128\}^2$ index pixels, $\delta$ is the Kroenecker delta, and $\delta(\ )$ is the Dirac delta function. The matrix may also be written as:

$$X(t) = [x_{\mu,v}](t). \quad (2)$$

An event-driven short-time spatial DFT (eSTsDFT) component may receive an event train $\{(t_k; p_k; \mu_k; v_k)\}$ as an input and output a real-time complex N×N (N=128) matrix. The event train may be received in one or more data packets. The short-time spatial DFT matrix, $\tilde{X}(t)$, may be computed as:

$$\tilde{X}(t) = \int S_N X(\tau) S_N^T w(\tau-t) d\tau, \quad (3)$$

where the N-th order DFT matrix, $S_N$ may be computed as:

$$S_N = \left[\frac{w_L^{mn}}{\sqrt{N}}\right]_{m,n=0,\ldots,N-1} = [s_N^0, \ldots, s_N^n, \ldots, \quad (4)$$

$$s_N^{N-1}] = \frac{1}{\sqrt{N}} \begin{bmatrix} 1 & 1 & 1 & \cdots & 1 \\ 1 & w_N & w_N^2 & \cdots & w_N^{N-1} \\ 1 & w_N^2 & w_N^4 & \cdots & w_N^{2(N-1)} \\ \vdots & \vdots & \vdots & \ddots & \vdots \\ 1 & w_N^{N-1} & w_N^{2(N-1)} & \cdots & w_N^{(N-1)(N-1)} \end{bmatrix},$$

where $w_n \triangleq e^{-\frac{2\pi i}{N}}$ is the n-th root of unity and $$S_N^n \triangleq \frac{1}{\sqrt{N}} \begin{bmatrix} 1 \\ w_N^n \\ \vdots \\ w_N^{n(N-1)} \end{bmatrix}$$

is the (n+1)-th column of $S_N$.

Furthermore, $w(-t) = \theta(t)\exp(-w_0 t)$ is an exponential short-time window function. The event-driven short-time spatial DFT module may compute the value of $\tilde{x}(t)$ at each sensor event $\{t_k\}$. In one configuration, the sensor events are first down sampled accordingly and the event-driven short-time spatial DFT module computes the values of the short term spatial DFT, $\tilde{x}(t)$, upon receipt of each down sampled event.

The event-driven feature extraction (eFE) component may further reduce the dimensionality of the processed event stream, from the N×N×2 dimensions of the event-driven short-time spatial DFT module (N=128 if not spatially down sampled) to an L=64-dimensional feature vector (e.g., from 128 128 complex numbers to 64 real numbers). Specifically, the L features may be binned instantaneous spectral power of $\tilde{x}(t), y(t) = \phi(\tilde{X}^*(t)\tilde{X}(t))$ where * is the conjugate transpose and $\phi(\ )$ is a log-linear transformation function.

$\tilde{X}^*\tilde{X}$ may be written as a 128×128 dimensional vector x and the linear function $\phi(\ )$, may be expressed as a matrix multiplication followed by a logarithm $y = \log(\phi x)$, where $$\varphi = \begin{bmatrix} \varphi_\rho \\ \varphi_\theta \end{bmatrix}$$

is a binary matrix of size 64×(128×128), which may contain two components of size 32×(128×128), corresponding to 32 radial and 32 angular power bins. These matrices are constant valued and computed priorly. For example, the matrices may be generated from training a machine learning algorithm on collected training data. Alternatively, the matrices may be user specified.

The event-driven feature extraction (eFE) component may compute the value of y(t) in an event-based manner. For example, y(t) may be computed at the end of every sensor event packet or group of packets that include multiple events.

The classification component, such as the event-driven support vector classification (eSVM) component, computes a time-varying class label function z(t) based on the real-time feature vector y(t) extracted by the eFE component, e.g., $z(t)=\psi(y(t))$, by virtue of a support vector machine with Gaussian radial basis function (RBF) as kernels.

The event-driven support vector classification component may compute the value of z(t) at the end of every sensor event packet or group of packets that occurs at least $\Delta t_{min}$ since the last classification. As described below, TABLE 1 specifies the mathematical description of the input/output objects to and from the components of the system. In the present application, the components may be referred to as modules. Although the update schedule in TABLE 1 indicates that the event-driven short-time spatial DFT module may update on every event, the present disclosure is not so limiting. According to aspects of the present disclosure, the event-driven short-time spatial DFT module may update after every down sampled event, or after receipt of multiple down sampled events.

TABLE 1

| Module | Input | Output | Output dimensions | Update schedule |
|---|---|---|---|---|
| DVS | Visual scene | $X((t; \{(t_k, p_k, \mu_k, v_k)\})$ | 128 × 128 binary | |
| eSTsDFT | X(t) | $\tilde{X}(t; \omega_0)$ | 128 × 128 complex | Every event |
| eFE | $\tilde{X}(t)$ | $y((t; \Phi)$ | 64 × 1 real | Every 100-200 events |
| eSVM | y(t) | z(t) | 1 × 1 categorical | Every 100-200 events separated by no less than 100 ms |

TABLES 2 and 3 provide the constant and state variables used for the event-driven short-time spatial DFT. TABLE 4 is pseudo-code for a single iteration of the detection system during which an event packet of length K is processed from the dynamic vision sensor.

TABLE 2

| Constant variable | Type | Dimension | Description |
|---|---|---|---|
| $\omega_0$ | real | 1 × 1 | Window fuction parameter (set to 10 Hz) |
| $S_{128}$ | complex | 128 × 128 | DFT matrix of order 128 |
| $\Phi$ | sparse binary | 64 × (128 × 128) | Feature matrix |
| $\Delta t_{min}$ | real | 1 × 1 | Minimum classification interval (set to 100 ms) |

TABLE 3

| State variable | Type | Dimension | Description |
|---|---|---|---|
| t | real | K × 1 | Event packet time stamp vector |
| p | −1, 1 | K × 1 | Event packet polarity vector |
| μ | 1, . . . , 128 | K × 1 | Event packet horizontal coordinate vecto |
| v | 1, . . . , 128 | K × 1 | Event packet vertical coordinate vector |
| $\tilde{X}$ | complex | 128 × 128 | Short-time spatial DFT matrix |
| y | real | 64 × 1 | Feature vector |
| z | categorical | 1 × 1 | Class label |
| $t_{current}$ | real | 1 × 1 | Current event time |
| $t_{last}$ | real | 1 × 1 | Last event time |
| $t_{classify}$ | real | 1 × 1 | Last classification time |

TABLE 4

| Pseudocode | Comment |
|---|---|
| 1 fetch from DVS128 (t,p,μ,v) | Event packet of length K |
| 2 for k from 1 to K do | For each event |
| 3 $t_{current} \leftarrow t_k$ | Current event time |
| 4 $\tilde{X} \leftarrow p_k [s_M^{\mu_k-1} s_N^{v_k-1}{}^T] + e^{-\omega_0(t_{current}-t_{last})} \tilde{X}$ | Update $\tilde{X}$ |
| 5 $t_{last} \leftarrow t_{current}$ | Current event becomes last event |
| 6 end for | |
| 7 $y \leftarrow \phi(\tilde{X}; \Phi)$ | Feature extraction |
| 8 if $t_{current} - t_{classify} > \Delta t_{min}$ do | If long enough since last classification |
| 9 $z \leftarrow \psi(y)$ | Classification |
| 10 end if | |

Event-Based Spatial Transformation

Aspects of the present disclosure are directed to applying image processing techniques to the output of an event-based sensor. The image processing techniques may perform functions that are substantially similar to techniques applied to frame-based vision systems. More specifically, aspects of the present disclosure are directed to event-based processing techniques that improve event-driven object detection. In one configuration, a transform, such as a Fourier transform, is applied to an output of a dynamic vision sensor.

According to an aspect of the present disclosure, a spatial transform is specified for an event-based image processing system. In one configuration, a two-dimensional matrix, such as a discrete Fourier transform (DFT) matrix, is generated with the dimensions of the matrix being based on the dimensions of the event-based sensor. For example, if a sensor is used to capture an area with a size of 128×128 then a size of the matrix is also 128×128. Thus, in one configuration, an asynchronous event-based output stream associated with the sensor dimensions is received and a discrete Fourier transform matrix is computed based on the dimensions of the event-based sensor.

After the matrix is computed, an initial output is initialized to a value, such as zero. After initializing the output, a loop is initialized to perform the transformation. Specifically, a first vector is selected corresponding to a row of the DFT matrix based on an x-coordinate of the event (DFT_X). Furthermore, a second vector is selected corresponding to a column of the DFT matrix based on a Y-coordinate of the event (DFT_Y). Moreover, an output is computed based on an outer product of the first and second vectors. Finally, the system will decay the output and increment before repeating the process to select the first and second vectors and determine the output.

In one configuration, the estimated transform at the pixel that generated the event is calculated as follows:

$$V_{x,y\_}\text{new} = V_{x,y\_}\text{old} + |E| \times \text{DFT}\_X \times \text{DFT}\_Y^T \quad (5)$$

In the equation above, |E| is the magnitude value of the event generated (e.g., polarity), DFT_X is the vector corresponding to a row of the DFT matrix based on an x-coordinate of the event, DFT_Y' is the transpose of the vector DFT_Y, $V_{x,y\_}$new is the Fourier transform of the pixel (x,y), and $V_{x,y\_}$old is the previously estimated value. In one configuration, the magnitude of the event |E| has a value of 1 or −1. Still, the value of the magnitude of the event |E| is not limited to 1 or −1 and may be other values. Additionally, the initial value of $V_{x,y\_}$old is zero.

As an example, a pixel with an address (2, 3) may spike in response to an event. In response to the spike, a row in the DFT matrix is selected corresponding to the y address (3) of the pixel. Additionally, in response to the spike, a column in the DFT matrix is selected corresponding to the x address (2) of the pixel. The selected column and row are transposed and the estimated transform at the pixel is calculated based on EQUATION 5. The estimated transform may be used to detect a spatial frequency of a pixel. Additionally, the value of the estimated transform may be used for event processing, such as event analysis, event filtering, event reconstruction, and/or event compression. The transform improves the speed of the event processing and reduces processor load.

Furthermore, as shown in TABLE 4, after the transform is applied, the value of the transform may be input to a feature extractor to be used in a classification process. That is, in one configuration, the transform is used in event classification based on the extracted features of the event.

In one configuration, $V_{x,y\_}$new may be multiplied by an exponential function $t(\alpha)$, where t is time and a is the decay rate. In some cases, a pixel may spike at a first time (T0) and $V_{x,y\_}$new is calculated for the spike at the first time. Furthermore, after the initial spike, the pixel may spike at a periodic rate. For example, the pixel may spike at a second time (T5), a third time (T10), and a fourth time (T15). Accordingly, $V_{x,y\_}$new continuously grows in response to the periodic spiking. Therefore, because $V_{x,y\_}$new is continuously growing, it may be desirable to decay the value using an exponential function.

In one aspect, the transformation is performed based on the pseudo code of TABLE 4. As shown in TABLE 4, an event packet is received from a sensor, such as the DVS sensor. The packet includes a time stamp vector, a polarity vector, a horizontal coordinate vector, and a vertical coordinate vector. Furthermore, as shown in TABLE 4, a loop is initialized for the number of events (k). Moreover, within the loop, the transform is calculated as follows:

$$\tilde{X} \leftarrow p_k \left[ s_M^{\mu_k - 1} s_N^{v_k - 1^T} \right]_{t_{last} \leftarrow t_{current}}^{t_{current} \leftarrow t_k} + e^{-w_0(t_{current} - t_{last})} \tilde{X} \quad (6)$$

In EQUATION 6, $t_k$ is the time of the event, $t_{current}$ is the current time, $t_{last}$ is the last event. Furthermore, $\tilde{X}$ is the calculated transform.

Figure 4:
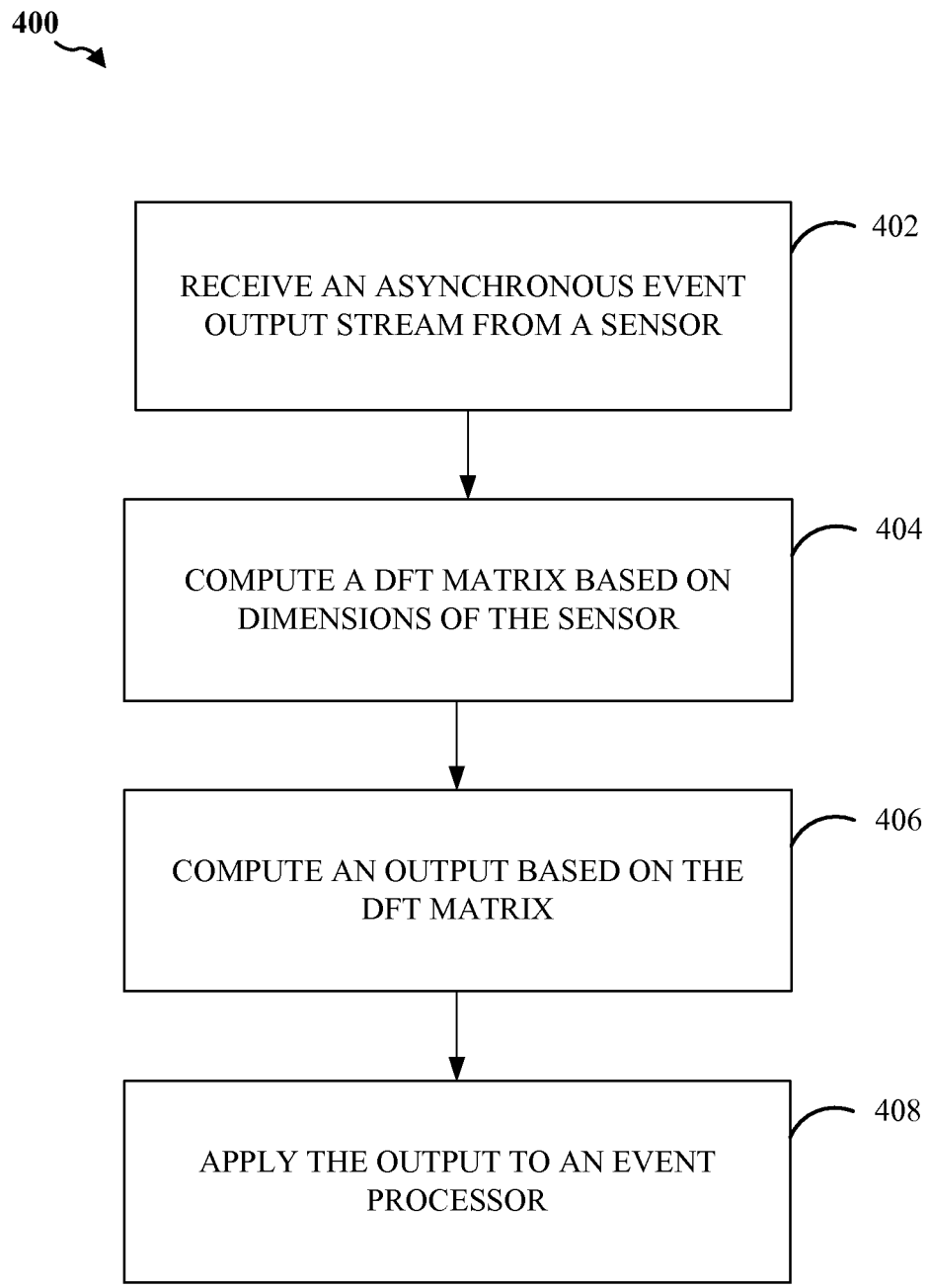
FIGS. 4 and 5 are flow diagrams illustrating methods for computing a spatial Fourier transform for an event-based system in accordance with aspects of the present disclosure.

FIG. 4 illustrates a block diagram 400 for computing a spatial Fourier transform for an event-based system in accordance with aspects of the present disclosure. As shown in FIG. 4, at block 402, the system receives an asynchronous event output stream from a sensor. Furthermore, at block 404, the system computes a DFT matrix based on dimensions of the sensor. Moreover, at block 406, the system computes an output based on the DFT matrix. Furthermore, at block 408, the system applies the output to an event processor.

Figure 5:
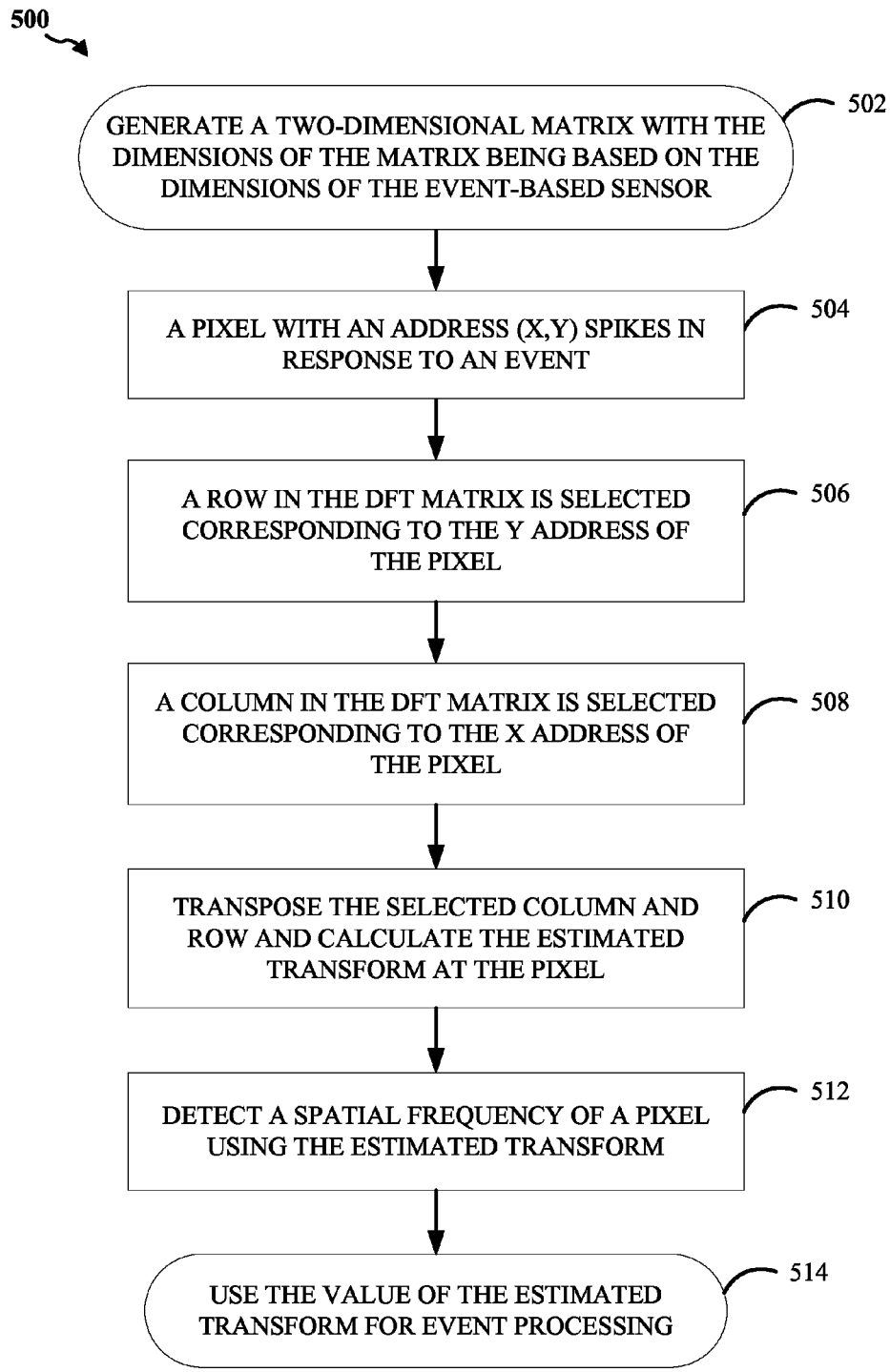

FIG. 5 illustrates a block diagram 500 for computing a spatial Fourier transform for an event-based system in accordance with aspects of the present disclosure. As shown in FIG. 5, at block 502, a two-dimensional matrix, such as a discrete Fourier transform (DFT) matrix, is generated with the dimensions of the matrix based on the dimensions of the event-based sensor. At block 504, a pixel with an address (x,y) spikes in response to an event. Additionally, in response to the spike, at block 506, a row in the DFT matrix is selected corresponding to they address of the pixel. Additionally, in response to the spike, at block 508, a column in the DFT matrix is selected corresponding to the x address of the pixel.

At block 510, the selected column and row are transposed and the estimated transform at the pixel is calculated. At block 512, the estimated transform may be used to detect a spatial frequency of a pixel. Furthermore, at block 514, the value of the estimated transform may be used for event processing.

In one configuration, a model, such as an event-based model or a machine learning model, is configured for receiving one or more events from a sensor, computing a discrete Fourier transform matrix based on dimensions of the sensor, computing an output based on the DFT matrix, and applying the output to an event processor. The model includes a receiving means, computing means, and/or applying means. In one aspect, the receiving means, computing means, and/or applying means may be the general-purpose processor 102, program memory associated with the general-purpose processor 102, memory block 118, local processing units 202, and or the routing connection processing units 216 configured to perform the functions recited. In another configuration, the aforementioned means may be any module or any apparatus configured to perform the functions recited by the aforementioned means.

According to certain aspects of the present disclosure, each local processing unit 202 may be configured to determine parameters of the model based upon desired one or more functional features of the model, and develop the one or more functional features towards the desired functional features as the determined parameters are further adapted, tuned and updated.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general-processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for computing a spatial Fourier transform for an event-based system, comprising:
receiving an asynchronous event output stream comprising an event from an event-based sensor, the event comprising an address;
generating a discrete Fourier transform (DFT) matrix, the event-based sensor and the DFT matrix having same dimensions;
generating an outer product of a first vector and a second vector obtained from a row and column of the DFT matrix corresponding to coordinates of the address;
generating an output based on the outer product;
applying the output to an event processor; and
classifying the event-based on the output.

2. The method of claim 1, in which generating the output comprises:
initializing the output;
selecting the first vector corresponding to the row of the DFT matrix based at least in part on an x-coordinate of the address;
selecting the second vector corresponding to the column of the DFT matrix based at least in part on a Y-coordinate of the address;
updating the output based on the outer product; and
decaying the output.

3. The method of claim 1, in which:
the event further comprises a polarity, and
the address comprises horizontal coordinates and vertical coordinates.

4. The method of claim 1, in which the event processor is a feature extractor.

5. An apparatus for computing a spatial Fourier transform for an event-based system, comprising:
a memory unit; and
at least one processor coupled to the memory unit, the at least one processor configured:
to receive an asynchronous event output stream comprising an event from an event-based sensor, the event comprising an address;
to generate a discrete Fourier transform (DFT) matrix, the event-based sensor and the DFT matrix having same dimensions;
to generate an outer product of a first vector and a second vector obtained from a row and column of the DFT matrix corresponding to coordinates of the address;
to generate an output based on the outer product;
to apply the output to an event processor; and
to classify the event-based on the output.

6. The apparatus of claim 5, in which the at least one processor is further configured:
to initialize the output;
to select the first vector corresponding to the row of the DFT matrix based at least in part on an x-coordinate of the address;
to select the second vector corresponding to the column of the DFT matrix based at least in part on a Y-coordinate of the address;
to update the output based on the outer product; and
to decay the output.

7. The apparatus of claim 5, in which:
the event further comprises a polarity, and
the address comprises horizontal coordinates and vertical coordinates.

8. The apparatus of claim 5, in which the event processor is a feature extractor.

9. A non-transitory computer-readable medium having program code recorded thereon for computing a spatial Fourier transform for an event-based system, the program code being executed by a processor and comprising:
  program code to receive an asynchronous event output stream comprising an event from an event-based sensor, the event comprising an address and a time stamp;
  program code to generate a discrete Fourier transform (DFT) matrix, the event-based sensor and the DFT matrix having same dimensions;
  program code to generate an outer product of a first vector and a second vector obtained from a row and column of the DFT matrix corresponding to coordinates of the address;
  program code to generate an output based on the outer product;
  program code to apply the output to an event processor; and
  program code classify the event-based on the output.

10. The computer-readable medium of claim 9, in which the program code to generate the output comprises:
  program code to initialize the output;
  program code to select the first vector corresponding to the row of the DFT matrix based at least in part on an x-coordinate of the address;
  program code to select the second vector corresponding to the column of the DFT matrix based at least in part on a Y-coordinate of the address;
  program code to update the output based on the outer product; and
  program code to decay the output.

11. The computer-readable medium of claim 9, in which:
  the event further comprises a polarity, and
  the address comprises horizontal coordinates and vertical coordinates.

12. The computer-readable medium of claim 9, in which the event processor is a feature extractor.

* * * * *